Nov. 8, 1927.

R. P. WHITE 1,648,570

FLOWERPOT

Filed Aug. 22, 1924

Inventor:
Richard P. White
By Gillson, Mann & Cox
Attys.

Nov. 8, 1927.                      1,648,570
R. P. WHITE
FLOWERPOT
Filed Aug. 22, 1924           2 Sheets-Sheet 2

Inventor:
Richard P. White
By Gillson, Mann & Cox
Attys.

Patented Nov. 8, 1927.

1,648,570

UNITED STATES PATENT OFFICE.

RICHARD P. WHITE, OF CHICAGO, ILLINOIS.

FLOWERPOT.

Application filed August 22, 1924. Serial No. 733,473.

This invention relates to receptacles and more particularly to flower pots and the like.

The principal object of the invention is the provision of new and improved means for connecting the pot to the saucer in which the pot is usually placed.

Earthen vessels, pots or other containers for house plants, hot house flowers and the like, are usually circular in form, and tapered toward their lower ends. A saucer is provided for supporting the vessel and for receiving any excessive moisture that may escape through the hole that is usually provided in the bottom of the vessel. Owing to the small base of the pot the same is easily turned over, which often results in a broken pot and consequent loss of the plant. Furthermore, it is often desirable to move the pot and saucer from one position to another. As the pots and saucers are usually constructed, they must be removed separately, which results in considerable inconvenience and often results in breaking the same in moving them from one place to another.

In order to overcome these difficulties the present invention contemplates the use of new and improved means for connecting the pot and its saucer together.

Other objects of the invention are the provision of a new and improved earthen vessel comprising a flower pot and its saucer as a single unitary structure that is cheap to manufacture, simple in construction, easily assembled, efficient in use, and that is ornamental in appearance.

Other and further objects and advantages of the invention will appear from the following description, taken in connection with the accompanying drawings, in which Fig. 1 is a side elevation of a flower pot and saucer, with the invention in position therein, with parts in section;

Figure 1:
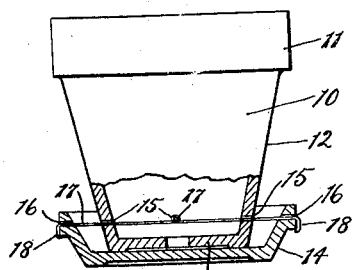

On the drawings, the reference character 10 designates an earthen flower pot of the usual construction comprising the upper cylindrical portion 11 and the lower tapered portion 12, having the apertured bottom 13 therein. The usual saucer 14 is provided for receiving the pot.

Suitable means are provided for securing the saucer to the pot whereby the pot and saucer are made to become a unitary structure. In the form of the device shown in Figs. 1 to 12, inclusive, the side walls of the pot and the saucer are provided with small openings or apertures through which suitable connecting members extend or engage for holding the saucer and pot in assembled relation. Since the vessels are of frangible material it is desirable as well as economical to provide the openings in the vessels while the material is in the plastic state, although it is understood that the openings may be made after the vessels have been subjected to the drying or burning process in the kiln.

Figure 2:
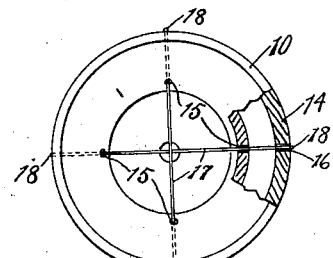
Fig. 2 is a plan view of the same, with parts in section.

In the form of the device shown in Figs. 1 and 2 a plurality of alined apertures 15 and 16 are provided in the pot 10 and saucer 14, respectively. Any suitable number of series of these alined openings may be employed. As shown, two series are employed, arranged at right angles to each other. Securing means such as the wires 17 extend through the alined openings 15 and 16 and are fastened in position in any convenient manner. Preferably the outer ends 18 of the wires 17 are extended slightly at each end beyond the saucer, and given a sharp bend against the saucer, which will anchor the wire to the saucer and prevent it from being pulled out when the pot is lifted. This arrangement not only secures the saucer to the pot in a simple, efficient and cheap manner, but also holds the pot centrally of the saucer whereby the saucer will materially assist in preventing the overturning of the pot in any direction.

Figure 3:
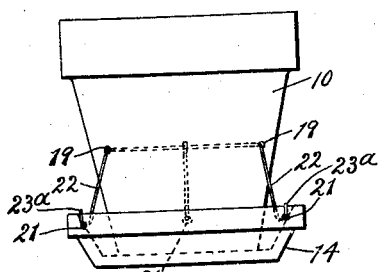
Fig. 3 is a side elevation of a flower pot and saucer, showing a modified form of the device.
Figure 4:
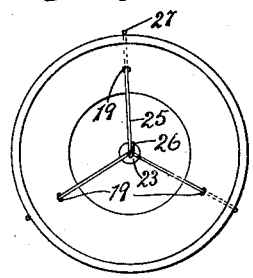
Fig. 4 is a plan view thereof.

In the form of the device shown in Figs. 3 and 4 the apertures in the pot are arranged in a plane above the plane of the apertures in the saucer. Any suitable number of apertures may be employed in the pot, with a corresponding number in the saucer. In the form disclosed in these figures three apertures 19 in the pot with a corresponding number of apertures 21 in the saucer, arranged 120° apart, are employed. In these figures the fastening means 22 which may be in the form of a wire extends through the pot and through two adjacent openings therein with its central portion bent to form an angle 23 and has its ends bent downwardly and provided with means as the hooks 23ª for engaging two adjacent openings in the saucer. The other fastening member 25 has its inner end secured to the angle 23 as by means of the hook 26 and extends outwardly through the remaining opening 19 in the pot. Its outer portion is bent downwardly and its outer end is secured to the saucer as by means of the hook 27 that engages the corresponding aperture 21 in the saucer 14. By means of this arrangement, the saucer may be very firmly secured to the pot, since the wire 25 may be so bent as to tension the wire 22 to the desired extent.

Figure 5:
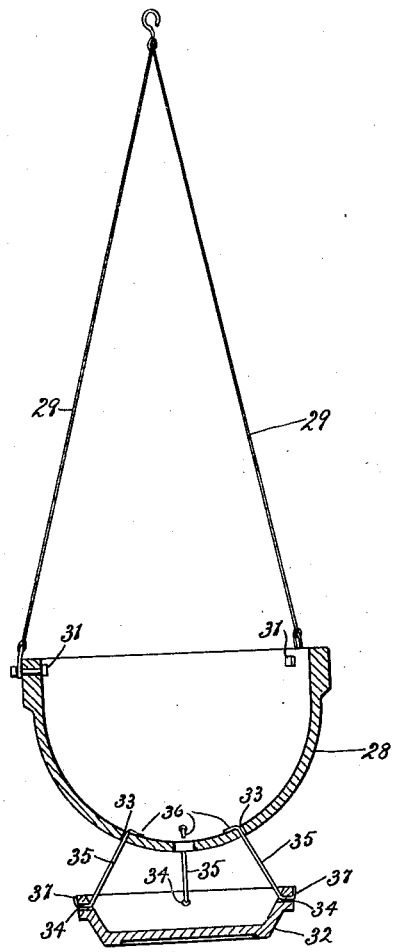
Fig. 5 is a vertical section of a different form of flower pot and saucer therefor, with a corresponding different adaptation of the invention.

In Fig. 5 is shown a hanging flower pot 28 which is provided with the cords or chains 29 secured to the pot as by means of the bolts 31, for suspending the pot from a suitable support. The saucer 32 may be and for the purpose of ornamentation preferably is, supported from the pot 28. As shown, the pot is provided in its lower portion with a plurality of apertures 33 and the saucer 32 is also provided with a corresponding number of apertures 34. Fastening means, as the wires 35, have their inner ends extending through the apertures 33 in said pot 28 and suitably secured therein as by being bent sharply as at 36. The lower ends of the wires 35 are secured in the apertures 34 in any suitable manner, as by means of the hooks 37.

Figure 6:
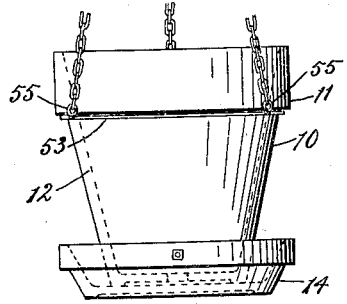
Fig. 6 is a side elevation of a flower pot and saucer, showing a further modified form of the invention.
Figure 8:
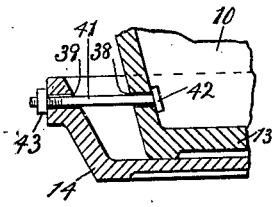
Fig. 8 is a section on line 8—8 of Fig. 7.
Figure 7:
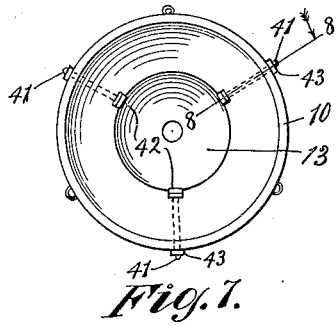
Fig. 7 is a plan view of the same.

In Figs. 6, 7 and 8 the flower pot 10 and saucer 14 are provided with series of apertures 38 and 39, respectively. These apertures may be and preferably are arranged in substantially the same plane. The fastening means for securing the two members together are in the form of rods or bolts 41 which may be provided with heads 42 which are arranged to conform to the tapered sides of the pot as clearly shown in Fig. 7. The outer ends of the rods or bolts 41 are provided with nuts 43 which hold the rods or bolts in adjusted position. By forming the heads 42 so they will conform to the inner surface of the side wall of the pot the bolts or rods 41 will be prevented from turning in applying the nuts 43. Any suitable number of these rods or bolts 41 may be employed, three arranged substantially equidistant from each other being shown in these figures. By adjusting the nuts 43 on the bolts the pot may be adjusted to occupy a central position within the saucer 14.

Figure 9:
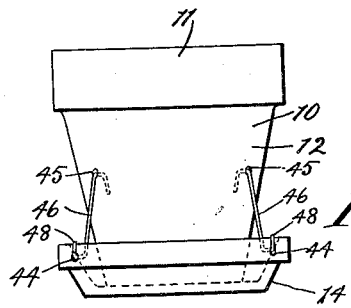
Fig. 9 is a side elevation of a flower pot and saucer, showing a further modified form of the device.
Figure 11:
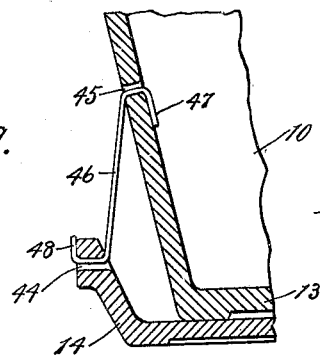
Fig. 11 is a section on line 11—11 of Fig. 10.
Figure 10:
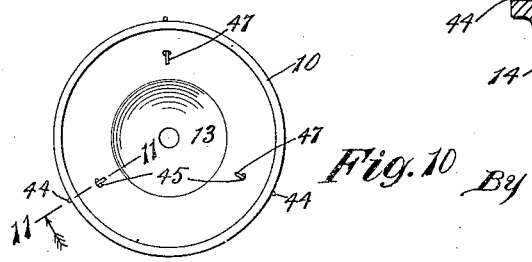
Fig. 10 is a plan view thereof.

In the form of the device shown in Figs. 9, 10 and 11 the saucer 14 is provided with a series of apertures 44 and the flower pot 10 is also provided with a corresponding number of apertures 45 arranged in a plane above that of the apertures 44 in the saucer. The means employed for securing the pot to the saucer comprises a series of fastening elements such as the wires 46 each having its upper end provided with a hook 47 for engaging an aperture 45 in the pot 10 and having its lower end provided with a hook 48 for engaging an aperture 44 in the saucer 14.

Figure 12:
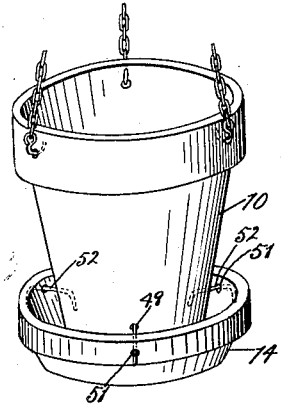
Fig. 12 is a perspective view of a flower pot and saucer showing another modified form of the invention.

The form of the device shown in Fig. 12 differs from that shown in Figs. 9, 10 and 11 in that the apertures 49 and 51 in the pot 10 and saucer 14, respectively, are in substantially the same plane. The fastening means, as the wires 52, each engages an aperture 49 and an aperture 51 and has its inner end bent downwardly against the inner surface of the pot and its outer end against the outer side of the saucer.

If desired, the inner, outer or both sides of the saucer may be glazed so that it will hold water, whereby vegetation in the pot may be watered by pouring water in the saucer, the porous nature of the pot and the holes therein permitting the water to enter said pot to furnish sufficient moisture to the soil contained therein.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim as my invention:

1. In combination, an earthenware flower pot having side and bottom walls, said side walls being provided with a series of apertures, an earthenware saucer for receiving said pot, said saucer being provided in its side wall with a series of apertures corresponding to said first-named series of apertures, and means engaging said apertures for holding said pot and saucer in assembled relation.

2. In combination, an earthenware flower pot having side and bottom walls, a saucer for receiving said pot, said pot and saucer being provided with alined apertures, a wire extending through said apertures and having its ends bent to engage the outer periphery of said saucer for holding said pot and saucer in assembled relation.

3. In combination, a pot member having bottom and side walls, said side walls being provided with a plurality of openings, a saucer member beneath said pot member, said saucer member being provided with a plurality of openings therein, and means engaging said openings in said saucer and side walls for holding said pot and saucer members in assembled relation.

4. In combination, a flower pot, a saucer therefor, a plurality of apertures extending through the side walls of said pot and saucer, and a plurality of straight wires extending through said apertures and having bent ends for retaining the pot and saucer in assembled relation.

RICHARD P. WHITE.